May 2, 1939.                M. ZADEK                2,156,367
                           SWIVEL JOINT
                         Filed Aug. 11, 1937
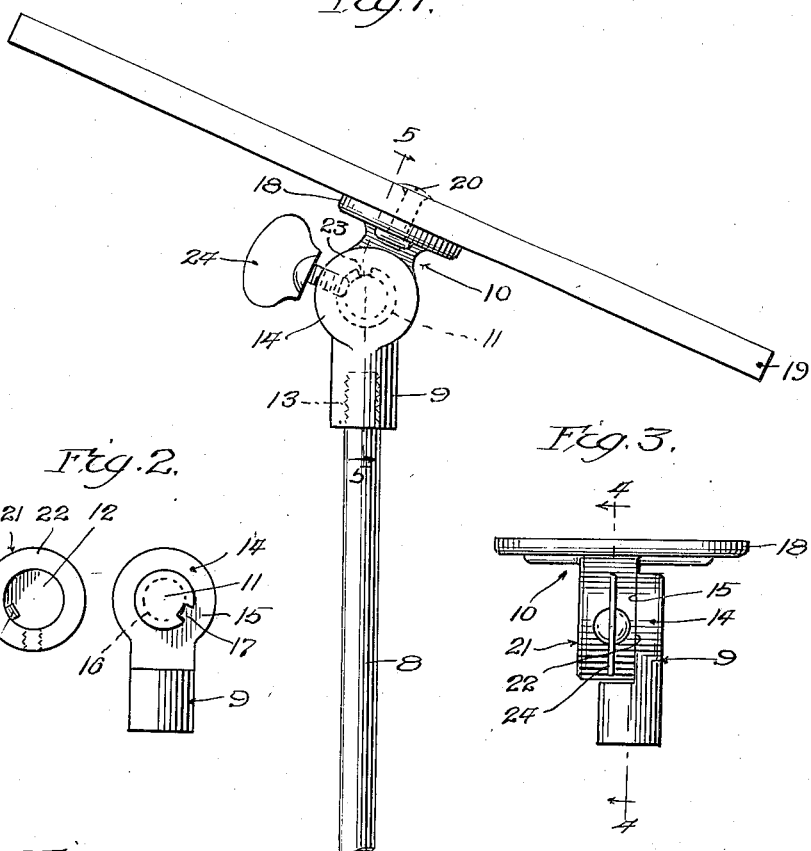
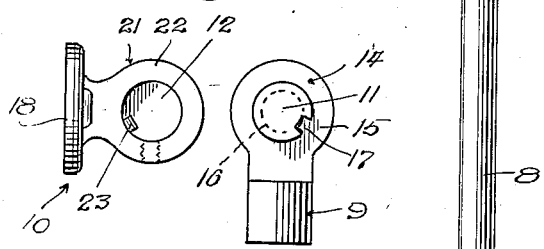
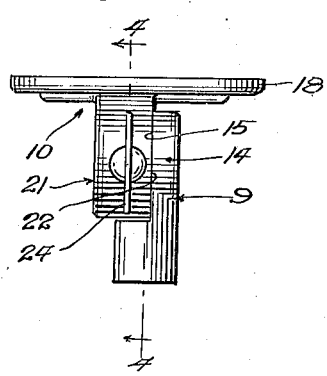
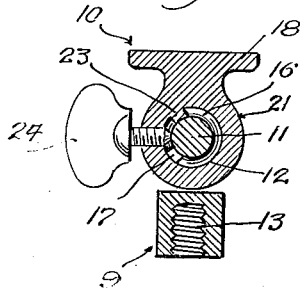
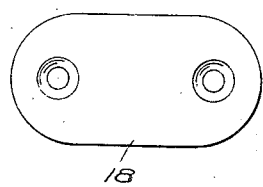
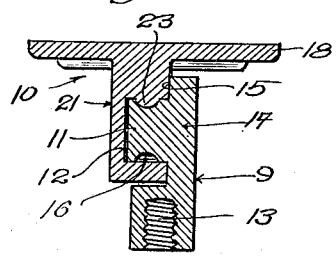
Inventor:
Milton Zadek,
by Charles O. Hervey,
His Atty.

Patented May 2, 1939

2,156,367

UNITED STATES PATENT OFFICE 2,156,367

SWIVEL JOINT

Milton Zadek, Chicago, Ill., assignor to Reflector Hardware Corporation, Chicago, Ill., a corporation of Illinois Application August 11, 1937, Serial No. 158,451

4 Claims. (Cl. 287—14)

This invention relates to swivel joints and its principal object is to provide a novel swivel joint between two members by which one member may be securely held in vertical or horizontal position or at any desired angle of inclination.

Another object is to provide a simple and comparatively inexpensive swivel joint in which the two members thereof cannot be taken apart while a set screw is in place.

Another object is to provide a swivel joint in which the two members thereof cannot be separated except when the screw is removed and the two members are adjusted to a definite angular relationship.

Another object is to provide a swivel joint unprovided with any aperture or set screw disposed coaxially with the axis of the swivel connection.

Other objects and advantages will appear in the course of this specification and with all of said objects and advantages in view, this invention consists in the several novel features hereinafter fully set forth and claimed.

The invention is clearly illustrated in the drawing accompanying this specification in which:

Fig. 1 is a side elevation of a swivel joint embodying a simple form of the present invention, showing the same supported upon a rod with a shelf carried by one of the members of the joint.

Fig. 2 is a side elevation of the two members of the swivel joint detached from each other.

Fig. 3 is an end elevation of the device.

Fig. 4 is a vertical section taken on the line 4—4 of Fig. 3.

Fig. 5 is a cross section taken on the line 5—5 of Fig. 1.

Fig. 6 is a plan of one of the members of the swivel joint.

In the embodiment of the invention illustrated in the accompanying drawing, the swivel joint is adapted to support a shelf, but it is to be understood that it may be used for many other purposes. As an example, the device may be inverted and used in that position to hold a rod or other object for any desirable purpose.

Referring to said drawing, the reference character 8 designates a rod which in this case forms the support for the swivel joint and is secured at its lower end to any desirable object. The upper end of the rod is threaded for attachment to one member of the swivel joint.

The swivel joint comprises two members 9, 10 swiveled together by a stud 11 formed integrally with one member and rotatively mounted in a bearing socket 12 formed in the other member. On the lower end of the member 9 is formed a supporting element, here shown as threaded socket 13, into which is screwed the threaded upper end of the supporting rod 8. The upper end of the member 9 is in the form of a head 14 and is made narrower than the socketed end. The head 14 has a flat face 15 and its edge is round. The stud 11 projects laterally from the flat face 15 and is disposed concentric with the round edge of the head. An annular or circumferential groove 16 is formed in the cylindrical face of the stud and the extreme end of the stud is formed with a notch 17 in its peripheral edge which extends to the groove 16, the purpose of which will be presently explained.

The member 10 is formed at its upper end with a supporting element, here shown in the form of a flat platelike transversely extending shelf holder 18, to which a shelf 19 or any other object may be fastened by screws 20 or other fastening means. The lower end of the member 10 is in the form of a head 21 having a flat face 22 adapted to bear against the flat face of the head 14. The edge of the head 21 is also round and is of the same diameter as that of the head 14. The bearing socket 12 extends inwardly from the flat face 22 and is concentric with the round face of the head and is of a depth to accommodate the stud when the two arms are joined together.

On the cylindrical face of the bearing socket 12 is a lug 23 which projects into the interior of the socket in position to enter the groove 16 in the stud. The lug 23 and notch 17 desirably are disposed at an angle to the longitudinal axes of the members 9, 10 as shown in Fig. 2, whereby the two members may only be joined by inserting the stud into the socket with the two members held at such an angle to each other that the lug 23 will pass through the notch 17 and enter the groove 16. By turning one member far enough to bring the lug out of register with the notch, the two members are held together against separation and cannot be disconnected until the lug 23 is brought into register with the notch 17. The member 10 may be adjusted to any desired inclination with respect to the member 9 whereby to hold the shelf or other object at any desired angle.

A thumb screw or set screw 24 threadedly mounted in a threaded bore, which extends radially inward from the round face of the head 21 in line with the groove 16, provides means for rigidly securing the two members together in any position of adjustment. When the members are adjusted to position, the thumb screw is screwed up tightly whereby its inner end is impinged against the face of the groove 16 in the stud. So long as the screw remains in the head 21, the two members cannot be adjusted to the position where the lug 23 registers with the notch 17, because the screw prevents the member 9 from being turned to such position. Consequently, so long as the screw is in place, the two members 9, 10 cannot become separated and cannot be taken apart. The screw must be removed to enable the two members 9, 10 to be adjusted to a position in which the lug 23 registers with the notch 17.

While the swivel joint has been shown and described as a device for supporting a shelf, it has many other uses. For instance, the device may be inverted or placed in any desired position and the supporting element 18 fastened upon a flat surface, either horizontal, vertical or at any inclined angle. The rod 8 may be used as a support for any object. Furthermore, each member may be formed with similar supporting elements, as, for instance, both members 9, 10 may be formed with the platelike supporting element or both may be formed with the screw socket for the reception of a rod or other equivalent supporting element.

I claim as new and desire to secure by Letters Patent:

1. A swivel joint comprising two members, each formed with a head having a flat face portion arranged to bear against the flat face portion of the other member, one head having a stud projecting from its flat face portion and the other head having a bearing socket extending inward from its flat face portion in which the stud is removably and rotatively held, concealed, cooperating lug and groove means on the stud and on the cylindrical wall of the bearing socket to prevent separation of the two members except in one angular position thereof, and threaded means to rigidly secure the two heads together in any position of adjustment, said threaded means entering said groove and when partially unscrewed, serving to permit relative rotation between the two members but preventing separation thereof.

2. A swivel joint comprising two members, each having a head formed with a flat face bearing against the flat face of the other head, one of said members having a stud projecting laterally therefrom and the other head having a bearing socket in which the stud is rotatively held, the stud and the internal wall of the socket having coacting lug and groove means to prevent separation between the heads, and there being a notch in the grooved member opening to said groove whereby said members cannot be separated except when disposed at a predetermined angle with respect to each other, and a screw threadedly mounted in the edge of the socketed head and impinging against the side of the stud, said screw, when partially unscrewed, permitting relative rotation between the two members, and being located in position to encounter the other member and prevent the members from being turned to said predetermined angle with respect to each other, whereby the two members cannot be separated except when the screw is wholly unscrewed.

3. A swivel joint comprising two members, each having a supporting element projecting therefrom, and each member being formed with a head having a flat face arranged to bear against the flat face of the other head, one head being formed with a bearing stud that extends laterally from its flat face and is formed with a circumferential groove and a notch leading outward from said groove and the other head being formed with a bearing socket in which the stud is rotatively held, a lug projecting from the face of the socket and projecting into said groove, and a screw threaded in the wall of the socketed head and impinging against the face of the groove, said screw when partially unscrewed, permitting relative rotation between the two members but preventing separation thereof.

4. A swivel joint comprising two members, one having a laterally extending stud formed thereon and the other having a laterally extending bearing socket formed therein for the reception of the stud, the stud having a circumferential groove and a notch leading therefrom to the extremity of the lug, and there being a lug formed on the cylindrical face of the bearing socket arranged to enter the groove through said notch, and serving, when located in the groove out of register with the notch, to prevent separation between the members, and a screw threadedly mounted in the socketed arm and impinging against the face of said groove, said screw when partially unscrewed permitting relative rotation between the two members but preventing separation thereof

MILTON ZADEK.